(12) United States Patent
Phillippi et al.

(10) Patent No.: US 10,018,020 B2
(45) Date of Patent: Jul. 10, 2018

(54) DECREASING PUMP LAG TIME USING PROCESS CONTROL

(71) Applicant: Halliburton Energy Services, Inc., Houston, TX (US)

(72) Inventors: Max L. Phillippi, Duncan, OK (US); Mehdi Mazrooee, Double Oak, TX (US); Chad A. Fisher, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 192 days.

(21) Appl. No.: 14/906,279

(22) PCT Filed: Oct. 31, 2013

(86) PCT No.: PCT/US2013/067761
§ 371 (c)(1),
(2) Date: Jan. 20, 2016

(87) PCT Pub. No.: WO2015/056430
PCT Pub. Date: May 7, 2015

(65) Prior Publication Data
US 2016/0305223 A1    Oct. 20, 2016

(51) Int. Cl.
*E21B 41/00* (2006.01)
*G06N 3/02* (2006.01)
(Continued)

(52) U.S. Cl.
CPC .......... *E21B 41/0092* (2013.01); *E21B 43/26* (2013.01); *E21B 43/267* (2013.01);
(Continued)

(58) Field of Classification Search
CPC .... E21B 41/0092; E21B 43/267; E21B 43/26; G06N 3/02; G05B 15/02; F04D 13/12; F04D 15/0066
See application file for complete search history.

(56) References Cited

U.S. PATENT DOCUMENTS 7,090,017 B2 * 8/2006 Justus ................... E21B 43/267
137/3
8,146,665 B2 * 4/2012 Neal ..................... E21B 21/003
166/250.01

(Continued)

FOREIGN PATENT DOCUMENTS

WO    2015065430 A1    5/2015

OTHER PUBLICATIONS

International Search Report and Written Opinion for PCT/US2013/067761 dated Jul. 30, 2014.

*Primary Examiner* — Charles Kasenge
(74) *Attorney, Agent, or Firm* — McDermott Will & Emery LLP

(57) ABSTRACT

Methods and systems wherein a first setpoint is used with a controller to translate the setpoint into a desired flow rate from a pump and used to determining an optimized command signal associated with the first setpoint with a process control system, the process control system configured to incorporate at least a first setpoint and a measurement signal to produce the optimized command signal. The optimized command signal is then stored in a memory of the computer. When the first setpoint is again desired, the optimized command signal associated with the first setpoint is read from the memory and transmitted to the pump.

26 Claims, 2 Drawing Sheets

(51) Int. Cl.
    *G05B 15/02*     (2006.01)
    *E21B 43/26*     (2006.01)
    *E21B 43/267*     (2006.01)
    *F04D 13/12*     (2006.01)
    *F04D 15/00*     (2006.01)

(52) U.S. Cl.
    CPC ......... *F04D 13/12* (2013.01); *F04D 15/0066* (2013.01); *G05B 15/02* (2013.01); *G06N 3/02* (2013.01)

(56) References Cited

U.S. PATENT DOCUMENTS

| | | | |
|---|---|---|---|
| 9,341,055 B2* | 5/2016 | Weightman | E21B 47/06 |
| 2005/0006089 A1* | 1/2005 | Justus | E21B 43/267 |
| | | | 166/250.01 |
| 2005/0058548 A1 | 3/2005 | Thomas et al. | |
| 2005/0166961 A1 | 8/2005 | Means et al. | |
| 2008/0236818 A1 | 10/2008 | Dykstra | |
| 2008/0262736 A1* | 10/2008 | Thigpen | E21B 43/128 |
| | | | 702/9 |
| 2008/0306892 A1* | 12/2008 | Crossley | G01F 1/74 |
| | | | 706/16 |
| 2009/0120635 A1* | 5/2009 | Neal | E21B 21/003 |
| | | | 166/250.15 |
| 2009/0157329 A1 | 6/2009 | Weightman et al. | |
| 2010/0132949 A1 | 6/2010 | DeFosse et al. | |
| 2010/0332036 A1* | 12/2010 | Medizade | F04B 49/065 |
| | | | 700/282 |
| 2011/0231024 A1* | 9/2011 | Medizade | F04B 49/065 |
| | | | 700/282 |
| 2013/0184640 A1* | 7/2013 | Li | A61M 5/14526 |
| | | | 604/67 |
| 2014/0166267 A1* | 6/2014 | Weightman | E21B 47/06 |
| | | | 166/250.01 |
| 2016/0090800 A1* | 3/2016 | Jeffryes | E21B 47/18 |
| | | | 175/25 |

* cited by examiner

DECREASING PUMP LAG TIME USING PROCESS CONTROL

BACKGROUND

The present disclosure relates to systems and methods for process control, and more particularly, to control processes related to pump flow rates.

Production of hydrocarbons form subterranean formations involves the design and use of complex fluid systems. For example, during the drilling of a hydrocarbon-producing well, drilling fluids (often called drilling muds) suspend and remove cuttings and lubricate the drill bit. During the drilling operation, it may also be necessary to alter the fluid, such as to seal off non-producing permeable formation regions or to minimize formation damage in the producing zones. Similarly, during a fracturing operation, the fracturing fluid is generally placed in stages such that the initial fluid is solids-free, followed by stages with various sizes and/or types of proppant. Thus, in these and other subterranean operations, it is often necessary to carefully control the system that creates the fluid to be sent down hole.

An automated system may be implemented to control the flow rate of pumps that supply the various components to the designed fluid and to monitor sensors in order to create a fluid having the desired ratio or concentration of components. Unfortunately, due to natural occurrences such as exposure to extreme temperatures and wear and tear on the machinery (e.g., additive pump impellers dulling or breaking), the actual flow rate of the additive pumps may not equal the desired flow rate (i.e., the setpoint) necessary for the proper solution concentration. To counteract this issue, the system may include a "feedback" or closed-loop control algorithm, wherein parameters such as the component pump flow rate may be monitored and continually incorporated by the control system in determining the necessary flow rate or quantity of additive still required to form the predetermined concentration.

However, even with a finely tuned control system, there may be a time delay between when a component setpoint is changed and when the component pump actually achieves a desired flow rate at the new setpoint value. This delay may be, for example, 30 to 60 seconds. In the past, the time between setpoint changes (i.e., a "stage" in the fracking process) may be a few minutes or hours, thus the pump delay of 30 to 60 seconds may be a small percentage of the overall stage time and may not have been job critical. However, current fracking jobs may require shorter stage times, for example of 15 to 30 seconds. Therefore, the delay duration may be unacceptable.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
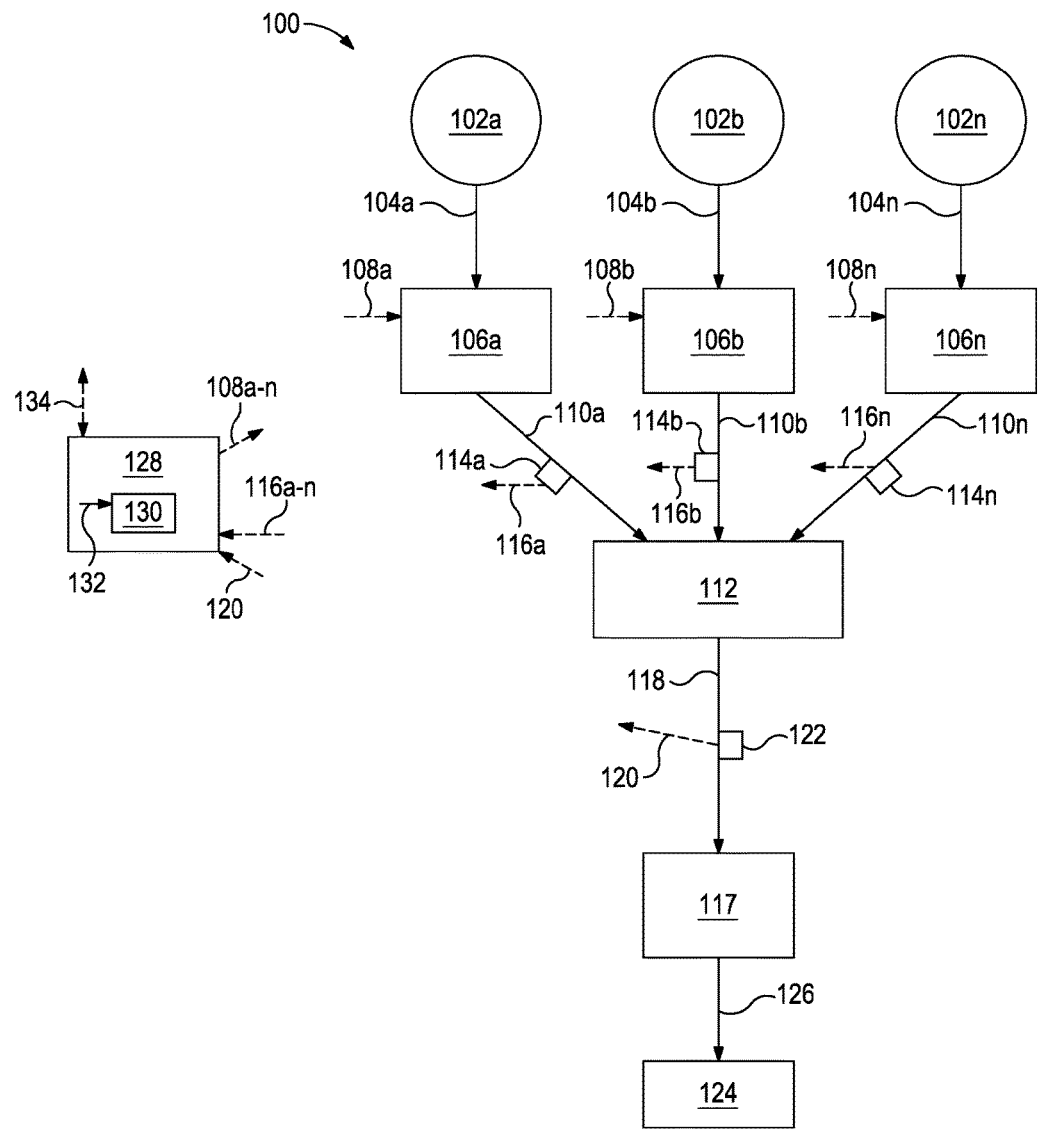
FIG. 1 is a simplified schematic view of a system for generating treatment fluids, according to one or more embodiments.

The present disclosure relates to systems and methods for process control, and more particularly, to control processes related to pump flow rates.

The present disclosure provides improved systems and methods for process-controlled generation of a treatment fluid. As used herein, the term "treatment fluid" may refer to any fluid designed for use in subterranean operations. Such operations include, but are not limited to, drilling operations, lost circulation operations, stimulation operations, sand control operations, completion operations, acidizing operations, scale inhibiting operations, water-blocking operations, clay stabilizer operations, fracturing operations, frac-packing operations, gravel packing operations, wellbore strengthening operations, and sag control operations. The methods and compositions of the embodiments of the present invention may be used in full-scale operations or pills. As used herein, a "pill" is a type of relatively small volume of specially prepared treatment fluid placed or circulated in the wellbore.

The system may include one or more pumps (or sand screws, etc.) capable of conveying treatment fluid components (also referred to as "components" and variations thereof), such as fluids or proppants, at a set flow rate into a blender to form a treatment fluid having predetermined concentrations of the components. The system may further include a computer with a closed-loop algorithm controlling and monitoring the pump flow rate and treatment fluid concentration. The system may also be capable of storing and recalling pump output control values necessary to overcome natural occurrences, such as pump wear and tear, and achieve desired flow rates, with the stored values correlating to a desired flow rate setpoint. Then, when a previously used setpoint is again desired, the system may recall the previously stored value as an initial output to the pump. This recall ability may act to reduce the total time required to achieve the desired flow rate by circumventing a portion of the delay caused by the control system having to iterate through a number of cycles.

The systems and methods disclosed herein may be suitable for use during subterranean operations such as fracturing in the oil and gas industry. However, it will be appreciated that the various disclosed systems and methods are equally applicable during other subterranean operations, such as cementing, drilling, etc. as described above. Moreover, the systems and methods disclosed herein may be applicable to other fields requiring tunable fluids during operation including, but not limited to, the food industry, the drug industry, the mining industry, etc.

As used herein, the term "proppant" or variations thereof refers to granular solid material used in fracturing operations to retain conductive channels in subterranean fractures through which fluids may travel. Suitable materials for proppants, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite proppants may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. In some embodiments it may be desirable to include degradable materials as at least a portion of the proppant. The mean particulate size generally may range from about 2 mesh to about 400 mesh or less on the U.S. Sieve Series; however, in certain circumstances, other sizes or mixtures of sizes may be desired and will be entirely suitable for practice of the embodiments of the present invention. In particular embodiments, preferred mean particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention.

Generally, the treatment fluids created in the embodiments of the present invention comprise a base fluid and one or more additives. Such additives include, but are not limited to salts, weighting agents, inert solids, fluid loss control agents, emulsifiers, dispersion aids, corrosion inhibitors, emulsion thinners, emulsion thickeners, viscosifying agents, gelling agents, surfactants, particulates (such as proppant or gravel), lost circulation materials, foaming agents, gases, pH control additives, breakers, biocides, crosslinkers, stabilizers, chelating agents, scale inhibitors, gas hydrate inhibitors, mutual solvents, oxidizers, reducers, friction reducers, clay stabilizing agents, and the like, and any combination thereof.

Suitable base fluids for use in conjunction with embodiments of the present invention may include, but not be limited to, oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween.

Referring to FIG. 1, illustrated is a simplified schematic view of a system 100 for generating treatment fluids, according to one or more embodiments. More specifically, the system 100 may include a controller 128 having a program 130 stored therein and capable of controlling one or more treatment fluid components pumps 106a-n and monitoring flow rates via flow meters 114a-n and 122.

As depicted, the system 100 may include one or more storage units 102a-n (shown as storage unit 102a, 102b, . . . 102n). The storage units 102a-n may be, for example, a hopper or tank, configured to hold or store treatment fluid components therein until drawn upon to form part of the treatment fluid. Each storage unit 102a-n may be fluidly coupled to a corresponding pump 106a-n (shown as pump 106a, 106b, . . . 106n) via a storage unit output flowline 104a-n (shown as storage unit output flowline 104a, 104b, . . . 104n) allowing fluid communication therethrough.

The pumps 106a-n may be capable of drawing or otherwise conveying treatment fluid components from the storage units 102a-n through the storage unit output flowline 104a-n. The pumps 106a-n may be communicably coupled to the controller 128, either wired or wirelessly, and configured to receive a command signal 108a-n (shown as command signal 108a, 108b, . . . 108n) from the controller 128 indicative of a desired pump flow rate (i.e., the rate at which the component from the storage units 102a-n flow through or are otherwise output by the pump 106a-n). As each pump may be independently controlled or set to different flow rates, it will be appreciated that the command signal 108a-n may be multiple individual command signals 108a-n, wherein each command signal 108a-n controls a specific pump 106a-n. Alternatively, the command signal 108a-n may be sent from the controller 128 as a single command signal 108a-n capable of independently controlling each pump 106a-n. While this description is in relation to controlling the pump 106a-n output (such as by controlling the voltage to the pump 106a-n or a power output percentage) it should be understood that embodiments of the present invention may also use pumps that operate at a steady work load and wherein the pump output is controlled using one or more valves.

The pumps 106a-n may be fluidly coupled to a blender 112 via pump output flowlines 110a-n (shown as pump output flowlines 110a, 110b, 110n) enabling the treatment fluid components to travel therethrough or otherwise be conveyed to the blender 112. The actual pump flow rate may be measured and sent to the controller 128 as measurement signals 116 (shown as measurement signal 116a, 116b, . . . 116n). In one embodiment, the pumps 106a-n may include internal sensors and circuitry (not shown) capable of measuring the actual pump flow rate and transmitting the corresponding measurement signal 116a-c to the controller 128. In other embodiments, as depicted, the pump flow rate may be measured by flow meters 114a-n (shown as flow meter 114a, 114b, . . . 114n) external to the pumps 106a-n. The flow meters 114a-n may be coupled or otherwise connected to the exterior of the pump output flowlines 110a-n and capable of determining the pump flow rate. In another embodiment, the flow meters 114a-n may intersect the pump output flowlines 110a-n or otherwise be interposed at a location between the pump 106a-n and the blender 112.

The blender 112 may be arranged to receive the treatment fluid components from the pumps 106a-n and capable of mixing or blending the treatment fluid components into a completed treatment fluid. While only one blender 112 is depicted, it will be appreciated that multiple blenders 112 may be used in series, parallel, or a combination thereof to create the treatment fluid without departing from the scope of the disclosure. The blender 112 may further be fluidly coupled to a manifold trailer 117 via a blender output flowline 118 enabling fluid communication therethrough.

The flow rate of the blender 112 may be measured and communicated to the controller via a measurement signal 120. In one embodiment, the blender 112 may include internal sensors and circuitry (not shown) capable of measuring the actual blender flow rate and transmitting the measurement signal 120. In other embodiments, the blender flow rate may be measured by a flow meter 122 external to the blender and capable of transmitting the measurement via the measurement signal 120. The flow meter 122 may be attached, coupled to, or otherwise intersect the blender output flow line 114.

As used herein, the term "manifold trailer" 117 is meant to collectively include one or more trucks and/or trailers comprising one or more pump manifolds for receiving, organizing, and/or distributing downhole fluids during drilling operations. Thus, upon receiving the treatment fluid from the blender 112, the manifold trailer 117 may thereafter convey the treatment fluid to the wellhead 124 via a manifold trailer output flowline 126. While the various flowlines (i.e., the storage output flowlines 104a-n, the pump output flowlines 110a-n, the blender output flowline 118, and the manifold trailer output flowline 126) are depicted as allowing direct fluid communication between two elements of the system 100, it should be appreciated that embodiments contemplated herein may include interposing elements without departing from the scope of the disclosure.

As briefly described above, the computer 128 may include a program 130 and be configured to output command signals 108a-n to the pumps 106a-n and receive the measurement signals 116a-n and 120. In some embodiments, the computer 128 may also control the blender 112 and/or the manifold trailer 117. The program 130 may include a closed-loop control algorithm, discussed in further detail in FIG. 2 below. While only one program 130 is depicted, the computer may include multiple programs 130 capable of interacting with each other and running in parallel or in series.

The computer 128 may further include onboard memory (not shown) and an input signal 132. Moreover, the computer 128 may be part of, and communicably coupled to a larger neural network of computers, servers, databases, and the like. Therefore, any reference herein to the memory of the computer 128 or the input signal 132 is hereby contemplated to also reference the memory of all devices capable of communicating, controlling, or otherwise interacting with the computer 128 or the system 100. For example, the input signal 132 may be derived from a keyboard, mouse, or touchscreen computing device directly connected to the computer 128. However, the input signal 132 may also be derived from similar peripheral devices connected to the neural network and communicating with the computer 128 via the signal 134. The input signal 132 may be comprised of one or more inputs and/or parameters while keeping within the scope of the present disclosure.

Briefly, in exemplary operation of the system 100, a desired flow rate for the pumps 106a-n (i.e., a setpoint) may be set in the controller 128, possibly by a user input via the input signal 132. The controller may then generate and send the command signals 108a-n corresponding to the desired flow rates to the pumps 106a-n, whereby, upon receiving the command signal 108a-n, the pumps 106a-n may begin or change flow rate of treatment fluid components from the associated storage units 102a-n. The treatment fluid components may flow or otherwise be conveyed through the pumps 106a-n and the pump output flowline 110a-n to the blender 112, wherein the actual flow rates may be measured by the flow meters 114a-n and transmitted back to the computer 128 via measurement signals 116a-n. The program 130 may then compare the measured flow rates (i.e., measurement signal 116a-n) to the desired setpoint (e.g., input signal 132) and determine an optimized value to be next transmitted as the command signal 108a-n such that the pumps 106a-n flow rate nears the desired setpoint.

Figure 2:
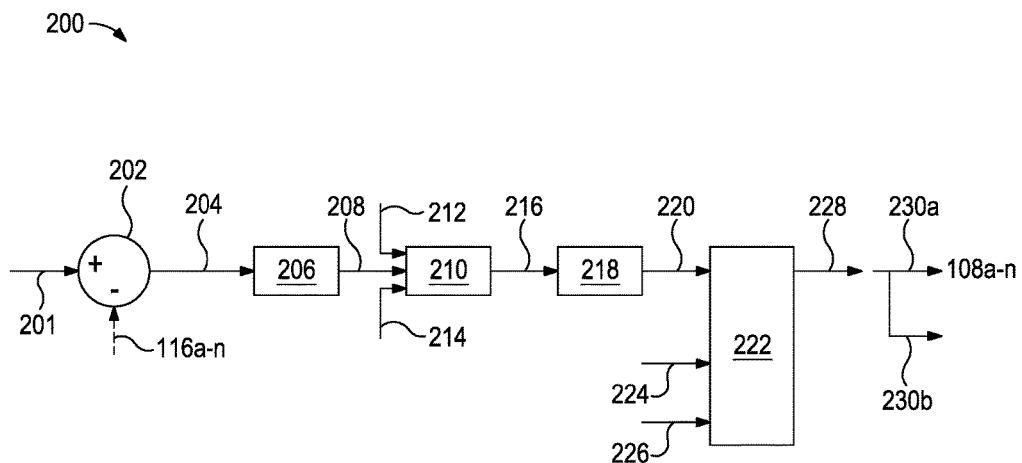
FIG. 2 is a block diagram of a process control system, according to one or more embodiments.

Referring now to FIG. 2, with continued reference to FIG. 1, illustrated is a block diagram of a process control system 200, according to one or more embodiments. The process control system 200 may be similar in some respects to the program 130 of FIG. 1, and therefore may be best understood with reference thereto, where like numerals indicate like elements that will not be described again. The process control system 200 may be a closed-loop type system having inputs parameters including a flow rate setpoint 201 and measurement signal 116a-n relating to an flow rate of components from one of the pumps 106a-n (FIG. 1). Additionally, the process control system 200 may be capable of determining an optimized value for transmission to the pump 106a-n via the command signal 108a-n.

As depicted, the flow rate setpoint 201 is positively fed into the summation block 202 and the measurement signal 116a-n is negatively fed into the summation block 202, and a summation output signal 204 is thereby determined. Accordingly, the summation output signal 204 is the calculated difference between the flow rate setpoint 132 and the measurement signal 116a-n. As such, the summation output signal 204 may be considered or referred to as an error response or e(t).

The summation output signal 204 (i.e., the error response e(t)) may then be fed as an input to a controller 206. In one embodiment, the controller may be a proportional-integral (PI) controller having a temporal response of $u(t)=K_p e(t)+K_i \int e(t)dt$, wherein e(t) is the error response 204, and $K_p$ is the proportional constant, $K_i$ is the integral constant, and u(t) is the resulting output of the controller. The PI controller constants $K_p$ and $K_i$ may then be adjusted or tuned, possibly via input signal 132 (FIG. 1), as known to those skilled in the art until a desired process control system 200 response is achieved. It should be appreciated that while a PI controller is discussed, embodiments contemplated herein may include any controller capable of being tuned, such as a proportional (P) controller, a proportional-derivative (PD) controller, a proportional-integral-derivative (PID) controller, a non-linear controller, or the like. The controller may output the resulting output u(t) as a controller output signal 208.

While not required, in some embodiments, the process control system 200 may include a dynamic limiter 210. The dynamic limiter 210 may include inputs such as a maximum value 212 (also known as a ceiling), a minimum value 214 (also known as a floor), and the controller output signal 208. The dynamic limiter 210 may also generate a dynamic limiter output signal 216. The maximum value 212 and minimum value 214 may be hard-coded or may be input, for example, via the input signal 132 (FIG. 1). In one embodiment, the dynamic limiter 210 may act to generally pass-through the controller output signal 208 as the dynamic limiter output signal 216, so long as the controller output signal 208 is higher than the minimum value 214 and lower than the maximum value 212. However, if the controller output signal 208 is less than the minimum value 214, the controller output signal 208 is not passed through and the minimum value 214 is output as the dynamic limiter output signal 216. Similarly, if the controller output signal 208 is greater than the maximum value 212, the maximum value 212 is output as the dynamic limiter output 216. In other embodiments, the dynamic limiter may include only one of the maximum value 212 or the minimum value 214, thus acting only as a limiting ceiling or limiting floor, accordingly.

While not required, in some further embodiments, the process control system 200 may include a modulator 218. As depicted, the dynamic limiter output 216 is fed into the modulator 218, which generates a resulting modulator output signal 220. The modulator 218 provides a mechanism for modulating or converting between the preferred control parameters (such as a flow rate) and the controls of the physical system (such as an electrical signal to a pump).

In one embodiment, a portion of the process control system 200 may be circumvented by including a logic unit 222. As depicted, the modulator output signal 220, a default or nominal value input 224, and a memory input 226 (i.e., a value read from the memory of the controller 128 (FIG. 1)) are inputs to the logic unit 222. The logic unit 222 may be programmed such that only one of the inputs 220, 224, or 226 is passed through as a logic unit output signal 228, as may be advantageous, for example, when initializing the system. In another example, this may be advantageous when desiring a particular known result, such as recalling a previously saved pump output control value via the memory input 226.

Where certain unrequired control elements from above are not desired, the output from the previous control element will proceed in place of the unselected output. For example, in embodiments wherein dynamic limiter 210 is not included, controller output signal 208 progresses directly to modulator 218 in place of dynamic limiter output 216. Similarly, where both dynamic limiter 210 and modulator 218 are not included, controller output signal 208 progresses directly to logic unit 222 in place of modulator output signal 220.

As depicted, the logic unit output signal 228 is also the resulting output signal 230a-b (shown as resulting output signal 230a and 230b) of the process control system 200. Actions that may be further performed on the resulting output signal 230a-b may include, but are not limited to, outputting the resulting output signal 230a to the pumps 106a-n via the command signal 108a-n and saving the resulting output signal 230b to the memory of the controller 128 for being recalled at a later point in time (e.g., later recalled as the memory input 226). One of skill in the art will appreciate that the process control system 200 may be implemented in software, hardware, or a combination thereof, and capable of operating with reference to a single or multiple measurement signals 116a-n and pumps 106a-n, and may include additional elements not specifically mentioned herein.

Figure 3:
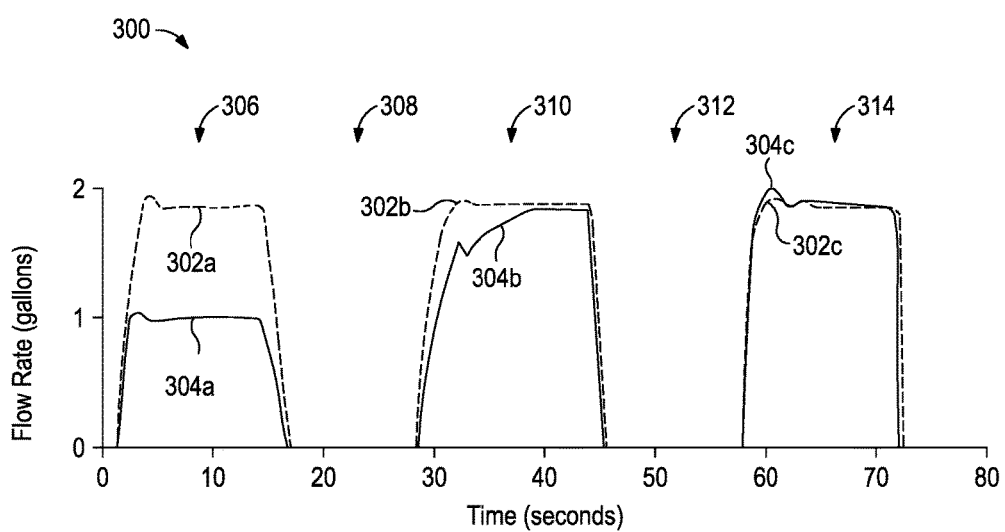
FIG. 3 illustrates a graph depicting measurement signals during exemplary operation of the system of FIG. 1 and process control system of FIG. 2, according to one or more embodiments.

Referring now to FIG. 3, with continued reference to FIGS. 1 and 2, illustrated is a graph 300 depicting measurement signals 116a-n during exemplary operation of the system 100 of FIG. 1 and process control system 200 of FIG. 2, according to one or more embodiments. A first measurement signal 302a-c (shown as measurement signal 302a, 302b, and 302c) corresponds to the measurement signal 116a (FIG. 1) derived from measuring the flow rate of treatment fluid components from the first pump 106a. A second measurement signal 304a-c (shown as measurement signal 304a, 304b, and 304c) corresponds to the measurement signal 116b (FIG. 1) derived from measuring the flow rate of treatment fluid components from the second pump 106b. The X-axis represents time in seconds (s) and the Y-axis represents flow rate in gallons of treatment fluid component per 1000 gallons of clean fluid (gal/Mgal).

As illustrated, the measurement signals 302a-c and 304a-c are depicted as measured over five treatment fluid stages (shown as a first stage 306, a second stage 308, a third stage 310, a fourth stage 312, and a fifth stage 314). The setpoint for the first pump 106a is 2 gal/Mgal for each of the first, third, and fifth stages 306, 310, and 314, respectively, as depicted by the measurement signal 302a-c. By contrast, the setpoint for the second pump 106b during the first stage 306 is 1 gal/Mgal, but changes to 2 gal/Mgal for the third stage 310 and fifth stage 314, as depicted by the measurement signal 304a-c.

As can be seen from the second measurement signal 304b of the second pump 106b during the third stage 310, a setpoint change from 0 gal/Mgal to 2 gal/Mgal occurs and the second pump 106b is turned on at about 28 seconds. In this example, the second pump 106b has not previously been set to the 2 gal/Mgal setpoint and so the logic unit 222 (FIG. 2) of the process control system 200 passes through the nominal value input 224 as the logic unit output 228, and the resulting output signal 230a is sent to the second pump 106b via the command signal 108a-n. That is, for third stage 310, the system does not have a previously saved pump output control value stored in the memory input 226 and so the logic unit 222 must control based only on either the modulator output signal 220 or nominal value input 224. As depicted by the second measurement signal 304b, due to delays caused by the feedback control system 100, including the process control system 200, the second pump 106b experienced a delay of about 10 to 11 seconds to achieve the desired flow rate of 2 gal/Mgal.

However, having controlled to a setpoint of 2 gal/Mgal, in third stage 310, the logic unit 222 saves an output control value stored in the memory input 226. During the fifth stage, the setpoint for the second pump 106b is again 2 gal/Mgal. Employing the principles disclosed herein, the previously saved optimized value associated with this setpoint may be read from the computer 128 memory as the memory input 226 (FIG. 2). The logic unit 222 may then pass through the memory input 226 as the initial logic unit output 228, thereby sending the optimized value to the second pump 106b via the command signal 108a-n. As depicted by the measurement signal 304c, by initially setting the logic unit output 228 based on a previously saved setpoint stored in the memory input 226, the time for the second pump 106b to achieve the desired flow rate has decreased to approximately 3 seconds.

It is recognized that the various embodiments herein directed to computer control and artificial neural networks, including various blocks, modules, elements, components, methods, and algorithms, can be implemented using computer hardware, software, combinations thereof, and the like. To illustrate this interchangeability of hardware and software, various illustrative modules, elements, components, methods and algorithms have been described generally in terms of their functionality. Whether such functionality is implemented as hardware or software will depend upon the particular application and any imposed design constraints. For at least this reason, it is to be recognized that one of ordinary skill in the art can implement the described functionality in a variety of ways for a particular application. Further, various components and blocks can be arranged in a different order or partitioned differently, for example, without departing from the scope of the embodiments expressly described.

Computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

Embodiments disclosed herein include A, B, and C:

Embodiment A

A method, comprising: obtaining a first setpoint with a computer, the first setpoint being a desired flow rate from a pump; transmitting a first command signal corresponding to the first setpoint from the computer to the pump; measuring a flow rate of the pump and transmitting a corresponding measurement signal to the computer; determining an optimized command signal associated with the first setpoint with a process control system, the process control system configured to incorporate at least the first setpoint and the measurement signal to produce the optimized command signal; storing the optimized command signal in a memory of the computer; changing the setpoint to a second setpoint, the second setpoint being a desired flow rate from the pump; transmitting a second command signal corresponding to the second setpoint from the computer to the pump; changing the setpoint to the first setpoint and reading the optimized command signal associated with the first setpoint from the memory and transmitting the optimized command signal to the pump.

Embodiment A may have one or more of the following additional elements in any combination:

Element A1: the method further comprising: removing components from a storage unit fluidly coupled to the pump; conveying the components into a blender with the pump, the blender being fluidly coupled thereto and configured to blend a treatment fluid; and conveying the treatment fluid downhole from the blender via a manifold trailer and a wellhead.

Element A2: the method wherein measuring the flow rate of the pump is performed by a flow meter.

Element A3: the method further comprising measuring the flow rate exiting the blender and transmitting a the flow rate exiting the blender to the computer.

Element A4: the method further comprising a neural network associated with the computer.

Element A5: the method wherein determining the optimized command signal includes interacting with a controller included in the process control system.

Element A6: the method wherein determining the optimized command signal includes interacting with a dynamic limiter included in the process control system.

Element A7: the method wherein determining the optimized command signal includes interacting with a modulator included in the process control system.

Element A8: the method wherein determining the optimized command signal includes interacting with a logical unit included in the process control system.

Embodiment B

A non-transitory computer readable medium including computer readable instructions stored thereon which, when executed by a processor, configure the processor to perform functions including: obtaining a first setpoint with a computer, the first setpoint being a desired flow rate from a pump; transmitting a first command signal corresponding to the setpoint from the computer to the pump; receiving a measurement signal with the computer, the measurement signal corresponding to a flow rate of the pump; determining an optimized command signal associated with the first setpoint with a process control system, the process control system configured to incorporate at least the first setpoint and the measurement signal to produce the optimized command signal; storing the optimized command signal in a memory of the computer; changing the setpoint to a second setpoint, the second setpoint being a desired flow rate from the pump; transmitting a second command signal corresponding to the second setpoint from the computer to the pump; changing the setpoint to the first setpoint and reading the optimized command signal associated with the first setpoint from the memory and transmitting the optimized command signal to the pump.

Embodiment B may have one or more of the following additional elements in any combination:

Element B1: the non-transitory computer readable medium wherein receiving the measurement signal with the computer further comprises transmitting the measurement signal to the computer from a flow meter measuring the flow rate of the pump.

Element B2: the non-transitory computer readable medium further comprising receiving a measurement signal corresponding to a measured flow rate of a blender.

Element B3: the non-transitory computer readable medium further comprising a neural network associated with the computer.

Element B4: the non-transitory computer readable medium wherein determining the optimized command signal includes interacting with a controller included in the process control system.

Element B5: the non-transitory computer readable medium wherein determining the optimized command signal includes interacting with a dynamic limiter included in the process control system.

Element B6: the non-transitory computer readable medium wherein determining the optimized command signal includes interacting with a modulator included in the process control system.

Element B7: the non-transitory computer readable medium wherein determining the optimized command signal includes interacting with a logical unit included in the process control system.

Embodiment C

A system, comprising: a pump fluidly coupled to a blender and configured to convey components thereto; and a computer communicably coupled to the pump, the computer capable of transmitting command signals to the pump corresponding to a desired flow rate and receiving measurement signals corresponding to a flow rate of the pump, wherein the computer includes a process control system configured to incorporate a setpoint and a measurement signal to produce an optimized command signal, and is capable of saving and recalling the optimized command signal in a memory.

Embodiment C may have one or more of the following additional elements in any combination:

Element C1: the system further comprising a manifold trailer and a wellhead, wherein the blender is configured to convey a treatment fluid downhole via the manifold trailer and the wellhead.

Element C2: the system further comprising a flow meter configured to measure the pump flow rate and transmit the corresponding measurement signals.

Element C3: the system further comprising a flow meter configured to measure the blender flow rate and transmit a corresponding measurement signal to the computer.

Element C4: the system wherein the computer is communicably coupled to a neural network.

Element C5: the system wherein the process control system further includes a controller.

Element C6: the system wherein the process control system further includes a dynamic limiter.

Element C7: the system wherein the process control system further includes a modulator.

Element C8: the system wherein the process control system further includes a logic unit.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:
1. A method, comprising:
obtaining a first setpoint with a computer, the first setpoint being a desired flow rate from a pump;
transmitting a first command signal corresponding to the first setpoint from the computer to the pump;
measuring a flow rate of the pump and transmitting a corresponding measurement signal to the computer;
determining an optimized command signal associated with the first setpoint with a process control system, the process control system configured to incorporate at least the first setpoint and the measurement signal to produce the optimized command signal;
storing the optimized command signal in a memory of the computer;

changing the first setpoint to a second setpoint, the second setpoint being a desired flow rate from the pump;

transmitting a second command signal corresponding to the second setpoint from the computer to the pump; and, changing the second setpoint to the first setpoint, reading and recalling the optimized command signal associated with the first setpoint from the memory, and transmitting the recalled optimized command signal from the memory to the pump.

2. The method of claim 1, further comprising:

removing components from a storage unit fluidly coupled to the pump;

conveying the components into a blender with the pump, the blender being fluidly coupled thereto and configured to blend a treatment fluid; and conveying the treatment fluid downhole from the blender via a manifold trailer and a wellhead.

3. The method of claim 2, wherein measuring the flow rate of the pump is performed by a flow meter.

4. The method of claim 2, further comprising measuring the flow rate exiting the blender and transmitting a the flow rate exiting the blender to the computer.

5. The method of claim 2, further comprising a neural network associated with the computer.

6. The method of claim 2, wherein determining the optimized command signal includes interacting with a controller included in the process control system.

7. The method of claim 2, wherein determining the optimized command signal includes interacting with a dynamic limiter included in the process control system.

8. The method of claim 2, wherein determining the optimized command signal includes interacting with a modulator included in the process control system.

9. The method of claim 2, wherein determining the optimized command signal includes interacting with a logical unit included in the process control system.

10. A non-transitory computer readable medium including computer readable instructions stored thereon which, when executed by a processor, configure the processor to perform functions including:

obtaining a first setpoint with a computer, the first setpoint being a desired flow rate from a pump;

transmitting a first command signal corresponding to the first setpoint from the computer to the pump;

receiving a measurement signal with the computer, the measurement signal corresponding to a flow rate of the pump;

determining an optimized command signal associated with the first setpoint with a process control system, the process control system configured to incorporate at least the first setpoint and the measurement signal to produce the optimized command signal;

storing the optimized command signal in a memory of the computer;

changing the first setpoint to a second setpoint, the second setpoint being a desired flow rate from the pump;

transmitting a second command signal corresponding to the second setpoint from the computer to the pump; and changing the second setpoint to the first setpoint, reading and recalling the optimized command signal associated with the first setpoint from the memory, and transmitting the recalled optimized command signal from the memory to the pump.

11. The non-transitory computer readable medium of claim 10, wherein receiving the measurement signal with the computer further comprises transmitting the measurement signal to the computer from a flow meter measuring the flow rate of the pump.

12. The non-transitory computer readable medium of claim 10, further comprising receiving a measurement signal corresponding to a measured flow rate of a blender.

13. The non-transitory computer readable medium of claim 10, further comprising a neural network associated with the computer.

14. The non-transitory computer readable medium of claim 10, wherein determining the optimized command signal includes interacting with a controller included in the process control system.

15. The non-transitory computer readable medium of claim 10, wherein determining the optimized command signal includes interacting with a dynamic limiter included in the process control system.

16. The non-transitory computer readable medium of claim 10, wherein determining the optimized command signal includes interacting with a modulator included in the process control system.

17. The non-transitory computer readable medium of claim 10, wherein determining the optimized command signal includes interacting with a logical unit included in the process control system.

18. A system, comprising:

a pump fluidly coupled to a blender and configured to convey components thereto; and a computer communicably coupled to the pump, the computer capable of transmitting command signals to the pump corresponding to a desired flow rate and receiving measurement signals corresponding to a flow rate of the pump, wherein the computer includes a process control system configured to:

incorporate a first setpoint and a measurement signal to produce and save in a memory an optimized command signal during a first stage;

change the first setpoint to a second setpoint during a second stage; and change the second setpoint to a first setpoint during a third stage and recall and transmit the optimized command signal to the pump.

19. The system of claim 18, further comprising a manifold trailer and a wellhead, wherein the blender is configured to convey a treatment fluid downhole via the manifold trailer and the wellhead.

20. The system of claim 18, further comprising a flow meter configured to measure the pump flow rate and transmit the corresponding measurement signals.

21. The system of claim 18, further comprising a flow meter configured to measure the blender flow rate and transmit a corresponding measurement signal to the computer.

22. The system of claim 18, wherein the computer is communicably coupled to a neural network.

23. The system of claim 18, wherein the process control system further includes a controller.

24. The system of claim 18, wherein the process control system further includes a dynamic limiter.

25. The system of claim 18, wherein the process control system further includes a modulator.

26. The system of claim 18, wherein the process control system further includes a logic unit.

* * * * *